(12) United States Patent  (10) Patent No.: US 8,589,511 B2
Nadler  (45) Date of Patent: Nov. 19, 2013

(54) VARIABLE CONTENT BASED ON RELATIONSHIP TO CONTENT CREATOR

(75) Inventor: Sima Nadler, Kochav Yair (IL)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 13/086,413

(22) Filed: Apr. 14, 2011

(65) Prior Publication Data
US 2012/0265843 A1 Oct. 18, 2012

(51) Int. Cl.
*G06F 15/16* (2006.01)

(52) U.S. Cl.
USPC .......................................... 709/217; 709/203

(58) Field of Classification Search
USPC ................................................ 709/217–219
See application file for complete search history.

(56) References Cited

U.S. PATENT DOCUMENTS

| | | | |
|---|---|---|---|
| 6,628,302 B2 | 9/2003 | White et al. | |
| 7,249,148 B2 | 7/2007 | Ehrich et al. | |
| 7,689,575 B2 | 3/2010 | Ramachandran et al. | |
| 7,698,173 B1 | 4/2010 | Burge et al. | |
| 7,747,644 B1 | 6/2010 | Reihi et al. | |
| 2001/0014895 A1 | 8/2001 | Sappal | |
| 2005/0216300 A1* | 9/2005 | Appelman et al. ................ 705/1 |
| 2006/0010378 A1 | 1/2006 | Mori | |
| 2007/0256143 A1* | 11/2007 | Prafullchandra et al. ........ 726/28 |
| 2008/0133311 A1* | 6/2008 | Madriz Ottolina ............. 705/10 |
| 2008/0320079 A1* | 12/2008 | Da Palma et al. ............. 709/204 |
| 2009/0049370 A1 | 2/2009 | Faris et al. | |
| 2009/0066722 A1* | 3/2009 | Kriger et al. ................... 345/619 |
| 2009/0164301 A1* | 6/2009 | O'Sullivan et al. ............. 705/10 |
| 2009/0196570 A1* | 8/2009 | Dudas et al. .................... 386/52 |
| 2009/0276311 A1* | 11/2009 | Pujet et al. ................. 705/14.52 |
| 2009/0282080 A1* | 11/2009 | Schlossberg et al. ...... 707/104.1 |
| 2010/0050216 A1* | 2/2010 | Ahrens ........................... 725/87 |
| 2010/0174748 A1* | 7/2010 | Strumpf et al. ............... 707/780 |
| 2012/0023201 A1* | 1/2012 | Gideon et al. ................ 709/219 |

FOREIGN PATENT DOCUMENTS

WO 2005017660 2/2005

* cited by examiner

*Primary Examiner* — Abdullahi Salad

(57) ABSTRACT

Method, system, and computer program product are provided for enabling a content creator who is not an owner of a content site to provide variable content to content consumers. The method includes: defining content consumers by their relationship to a content creator; receiving a request for a content item from a content consumer; determining the relationship of the content consumer to the content creator; and returning a version of the content item for the determined relationship. A content creator may select content of a content item, and may provide different versions of the selected content with an indication of a relationship between the content creator and a content consumer for a version.

21 Claims, 7 Drawing Sheets

VARIABLE CONTENT BASED ON RELATIONSHIP TO CONTENT CREATOR

BACKGROUND

This invention relates to the field of providing information content. In particular, the invention relates to providing variable content based on the relationship between the content creator and the content consumer.

With modern web technologies everyone can contribute information content. Content may be provided or contributed via a blog, posts to forums, emails sent to email lists, status updates on social networking sites such as Facebook (Facebook is a trade mark of Facebook, Inc.), movies uploaded to YouTube (YouTube is a trade mark of YouTube, LLC), etc. This content is often viewed by a very wide population. Even if the user limits the distribution of the content to his "friends", such friends are often composed of family (both close and distant relatives), colleagues at work, etc.

When posting content, it is sometimes desirable to provide different versions of the content depending on the relationship between the content creator and the reader/consumer/viewer. For example, when posting something about a recent illness the information might be different depending on who is reading it.

Some social networking sites enable different content to be provided to different defined groups of people. However, this requires writing separate content for each group of people.

BRIEF SUMMARY

According to a first aspect of the present invention there is provided a computer-implemented method for providing variable content to content consumers, performed by a computerized device, comprising: defining content consumers by their relationship to a content creator; receiving a request for a content item from a content consumer; determining the relationship of the content consumer to the content creator; and returning a version of the content item for the determined relationship.

According to a second aspect of the present invention there is provided a computer-implemented method of providing variable content at a client, for distribution to content consumers by a server, comprising: selecting a section of content of a content item; providing different versions of the selected section of content for different consumers based on their relationship to the content consumer; and indicating a relationship between a content creator and a content consumer that the version is for.

According to a third aspect of the present invention there is provided a computer program product for providing variable content to content consumers, the computer program product comprising: computer readable non-transitory storage medium having computer readable program code embodied therewith, the computer readable program code comprising: computer readable program code configured to: define content consumers by their relationship to a content creator; receive a request for a content item from a content consumer; determine the relationship of the content consumer to the content creator; and return a version of the content item for the determined relationship.

According to a fourth aspect of the present invention there is provided a system for providing variable content to content consumers, comprising: a processor; relationship database containing stored relationships between content consumers and a content creator; a content database containing stored versions of a content item referenced by a relationship; a content compiler including: a content request receiver for receiving from a content consumer a request for a content item; a relationship lookup component for determining the relationship of the content consumer to the content creator; and a content retriever component for returning a version of the content item for the determined relationship.

According to a fifth aspect of the present invention there is provided a client system for providing variable content, comprising: a processor; a selecting component for selecting content of a content item; a version component for providing different versions of the selected content; and a relationship component for indicating a relationship between a content creator and a content consumer for a version of the selected content.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

Figure 1:
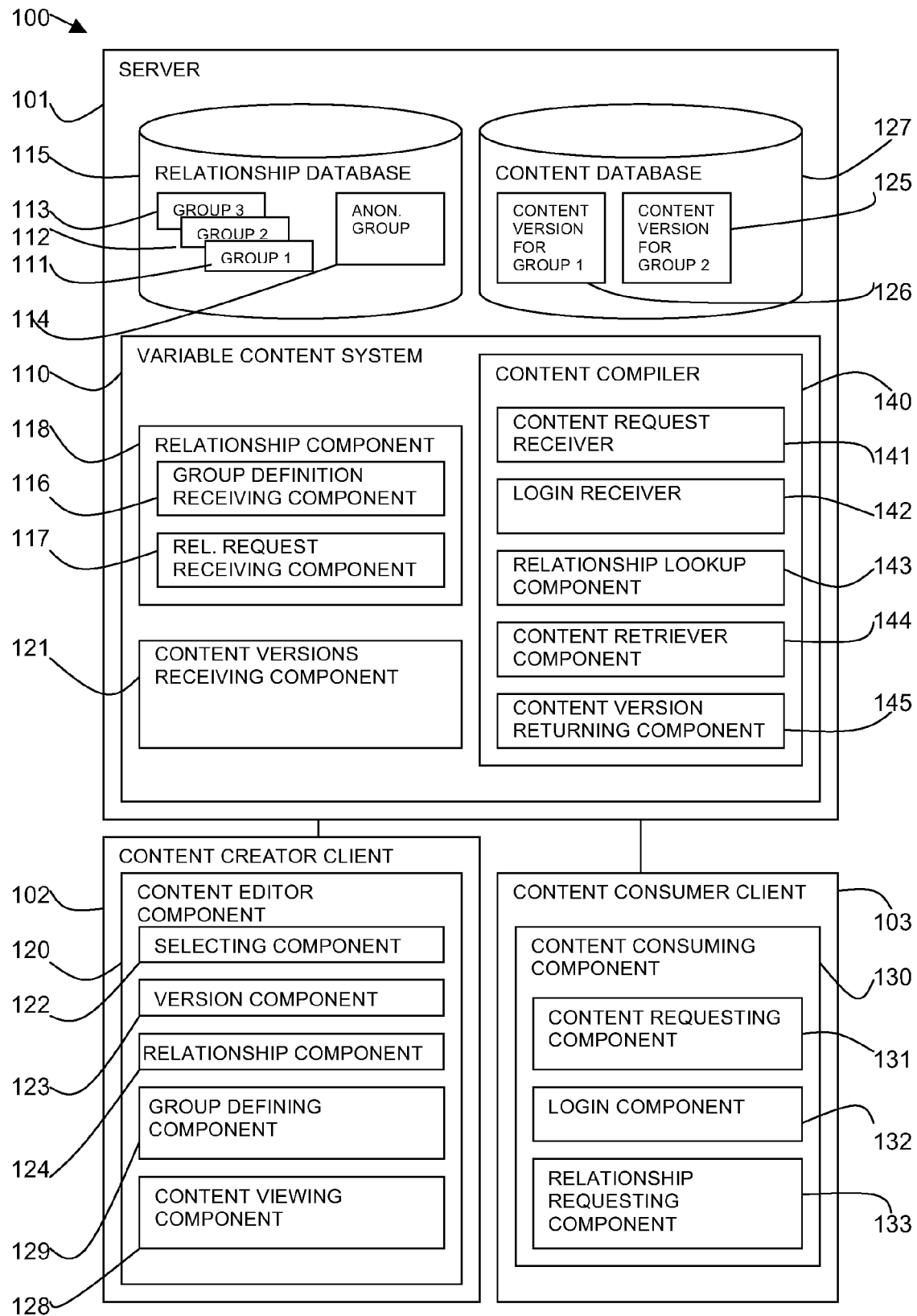
FIG. 1 is a block diagram of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Method, system and computer program product are described in which provided content is displayed in such a way that different variations of the content are displayed to different people based on their relationship to the content creator as defined by the content creator. The term content creator is used to include a person, group of people, organisation, etc. who creates, amends, re-posts, adds or contributes content. The content may be text, image, audio, or any combination of media types. A content creator may post, send, or distribute the content to content consumers. Content may be posted or contributed to via blogs, forums, social networking sites, email distribution lists, etc.

The content creator has relationships with the content consumers, who may be viewers, readers, consumers, listeners, who may download the content, add to the content, etc. The content creator is not generally the site owner or site provider where the content is provided, but instead it is the content author, provider, owner or contributor who supplies the content to a site owner or provider. The content creator may also be a site owner or site provider.

To enable this functionality, the content creator groups content consumers into groups such as Close Friends, Work Colleagues, Customers, Extended Family, Soccer Team, etc. A group may include one or more content consumer, so may be a single individual in a category. The content consumer may be an individual, an online entity, an organisation, or a group itself.

The content creator then uses a special editor to write his content. In the case of text content, the editor works like a regular text editor with the additional feature that the content creator can highlight a word, phrase, sentence, or paragraph and provide alternative versions of the text for each of the different groups or combinations of the groups or individuals the content creator defined.

An equivalent process may be implemented in video and audio editors in order to create music and movies with variations based on the same concept.

When a content consumer in the form of a user views the content published by the content creator, the appropriate version will be displayed based on the user's relationship with the creator. If the user is not logged in, then an anonymous version of the content will be displayed which may be a default version of the content.

Sites supporting this functionality may include a mechanism to request a relationship with the content creator, similar to the way social networking sites work.

Referring to FIG. 1, a block diagram shows an embodiment of the described system 100 of providing variable content.

A server 101 may include a variable content system 110 to enable variable content to be viewed as provided by a content creator client 102 and as viewed by a content consumer client 103.

A content creator client 102 may include a group defining component 129 for defining groups 111-113 of one or more content consumers having a given relationship or a similar relationship to the content creator. An anonymous group 114 may be defined as having an unknown relationship with the content creator. Unidentified content consumers are automatically considered "anonymous users" and belong to the anonymous group 114.

At the server 101, the variable content system 110 may include a relationship component 118 including a group definition receiving component 116 for receiving group definitions from the content creator client 102. A relationship database 115 stores the defined groups of consumers 111-114.

The relationship component 118 at the server 101 may also include a relationship request receiving component 117 for receiving requests from content consumers to have a defined relationship with a content creator and therefore to be a member of a defined group. The relationship request receiving component 117 may forward the request to the content creator client 102 for a response.

A content editor component 120 may be provided at the client creator client 102 which works like a regular text/music/video editor with additional functionality. The additional functionality may be provided by a content selecting component 122, a version component 123, and a relationship component 124. A content selecting component 122 enables the content creator to select part or all of a content item and the version component 123 enables multiple different version 125-126 of the selected content to be provided. The relationship component 124 enables a relationship or group to be associated with a version 125-126 of the selected content. The content editor component 120 may include a content viewing component 128 to view the provided content in order to test the appearance/content of the variable content prior to finalizing the content.

At the server 101, the variable content system 110 may include a content versions receiving component 121 for receiving the versions of the selected content with their associated relationship or group. The different versions 125-126 of the selected content may be stored in a content database 127 together with a mapping to a group 111-114 or relationship.

The content creator using the content editor component 120 may highlight a word, phrase, sentence, or paragraph (video/audio sub-clip) using the content selecting component 122 and provide alternative versions using the version component 123 for each of the different groups (or combinations of the groups or individuals) he defined.

A content consuming component 130 may be provided which uses regular web protocols and technologies on the content consumer client 103 side. On the server 101 side, a request to consume content is received by a content compiler 140 of the variable content system 110. The request to consume content may be to view, download, edit, etc.

The content consuming component 130 may include a content requesting component 131 for requesting content to be consumed and a login component 132 which may be provided to identify the consuming client.

The content consuming component 130 may also include a relationship requesting component 133 for requesting that a consuming client have a defined relationship with a content creator.

A content compiler 140 may include a content request receiver 141 for receiving a request from a content consumer client 103 to consume content. The content request receiver 141 may also be accessible to the content creator client 102 so they can test the content versions. A login receiver 142 may be provided for determining an identity of a content consumer. A relationship lookup component 143 may be provided to lookup a content consumer in the relationship database 115 to determine to which group 111-114 the content consumer belongs. A content retriever component 144 may be provided to retrieve the content version 125-126 for the determined group 111-114 from the content database 127. A content version returning component 145 may return the retrieved content version to the content consumer client 103.

When a content consumer views a web page with variable content, the usual protocols may be used. The user's login information may be provided to identify the user. On the server side, the content compiler 140 may receive the request for the content with the user's login information. The content compiler 140 may take the user's login information and perform a lookup on the relationship database 115 to determine to which group the user belongs. If the content consumer does not belong to any group, or if no login information has been provided, then he is considered an anonymous user. With the group in hand, the content database 127 may be queried and the appropriate content version may be retrieved.

Figure 2:
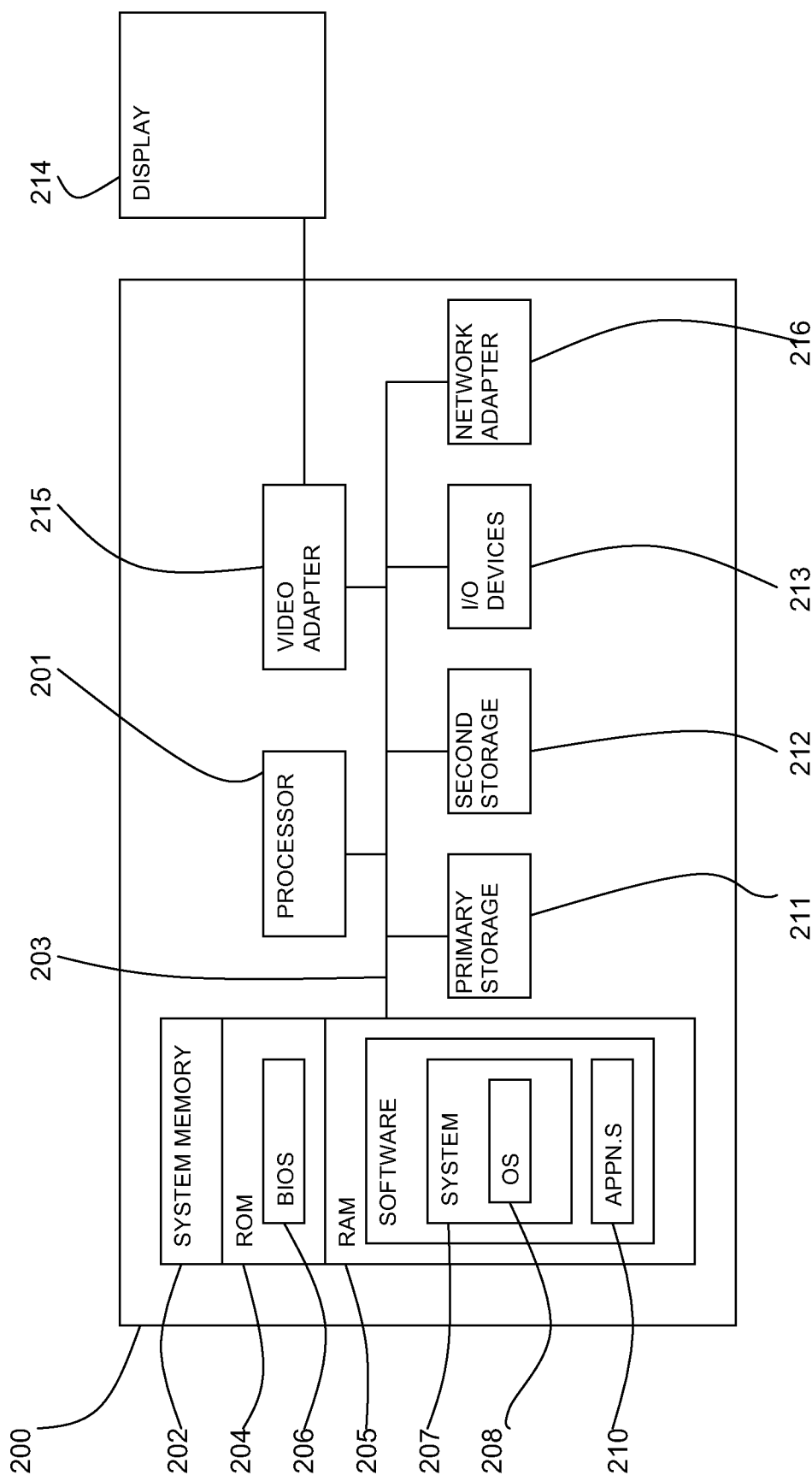
FIG. 2 is a block diagram of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
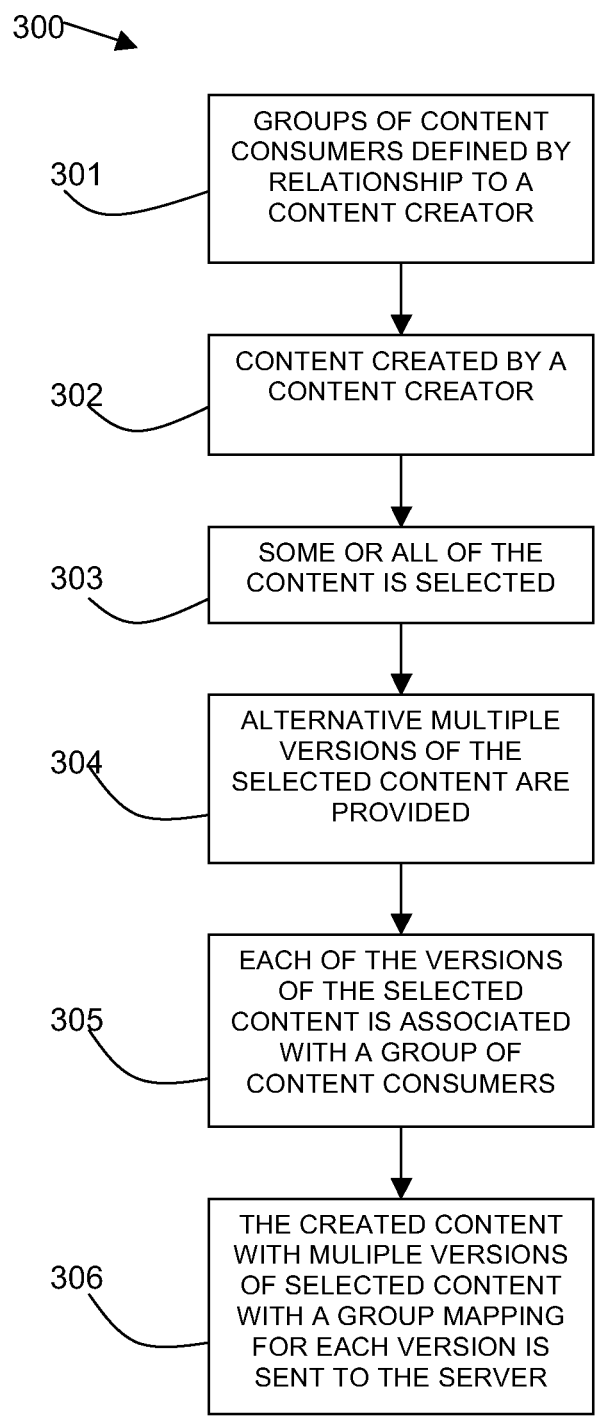
FIG. 3 is a flow diagram of a method in accordance with an aspect of the present invention.

Referring to FIG. 3, a flow diagram 300 shows an embodiment of a method of content creation at a client.

Firstly, groups of one or more content consumers may be defined 301 by their relationship to a content creator and stored in a relationship database at a server. Content is created 302 by a content creator at the client. Some or all the content may be selected 303. Alternative multiple versions of the selected content may be provided 304 by the content creator. Each of the versions of the selected content may be associated 305 with a group of content consumers. One of the versions of the selected content may be provided as a default content for anonymous consumers or consumers who do not belong to a given group. The created content with multiple versions of selected content with a group mapping for each version may be sent 306 to the server. Each of the versions of the selected content may be stored in a content database at the server with a mapping to a defined group of content consumers.

Figure 4:
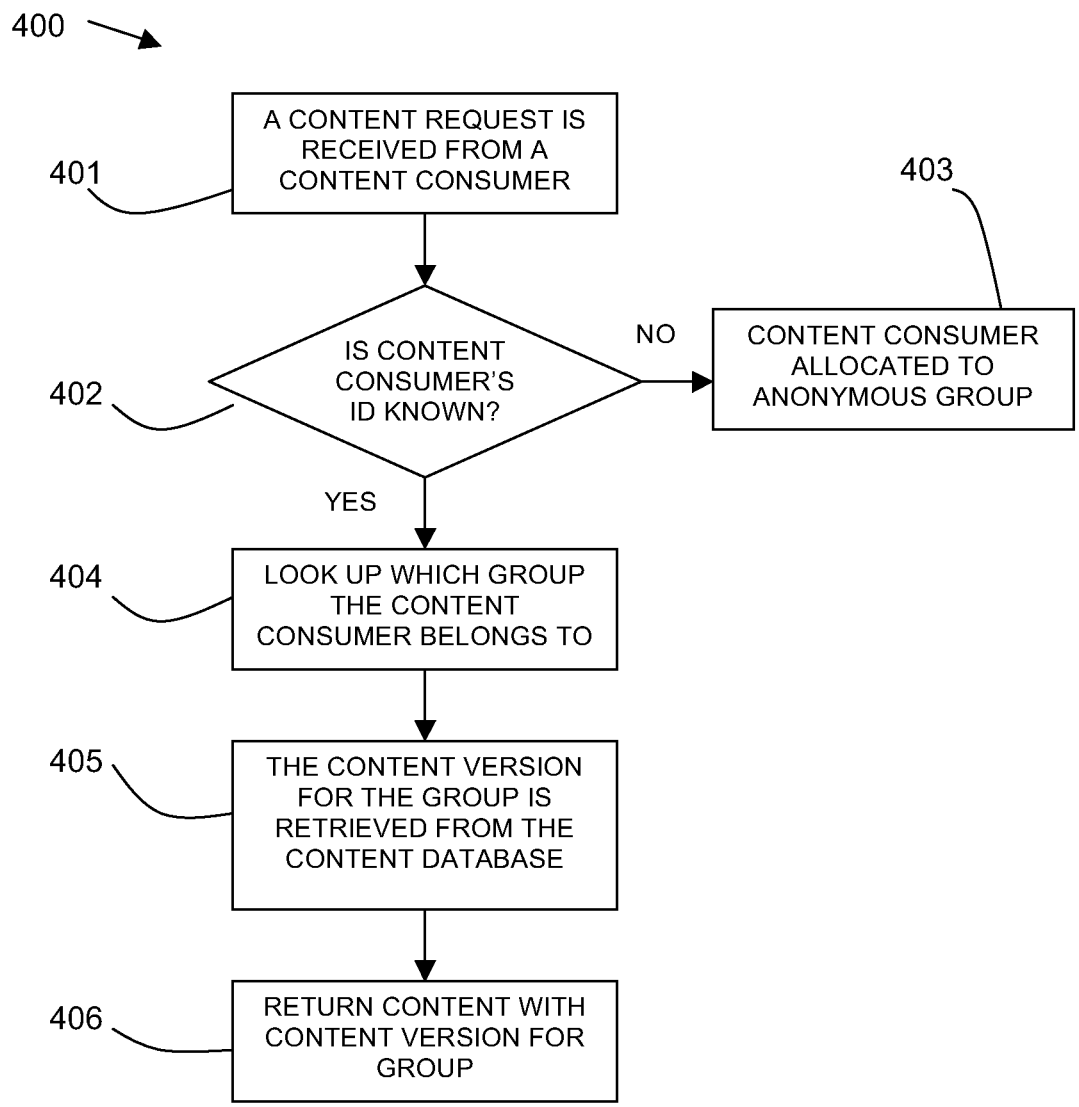
FIG. 4 is a flow diagram of a method in accordance with an aspect of the present invention.

Referring to FIG. 4, a flow diagram 400 shows an embodiment of a method of providing variable content at a server.

A content request may be received 401 at a server from a content consumer. It may be determined 402 if the content consumer's identity is known, for example, by a login process. If the content consumer's identity is not known, the content consumer may be allocated 403 to the anonymous group for which a default content may be defined. If the content consumer's identity is known, the group to which the content consumer belongs is looked up 404 from the relationship database. If the content consumer does not belong to any of the groups, again the anonymous group is used and the default content supplied to the content consumer.

The applicable content version may be retrieved 405 from the content database for the group of the content consumer or the anonymous group. In a given content there may be multiple sections that have versions for the group. The content including the content versions appropriate for the consumer may be returned 406 to the content consumer.

Figure 5:
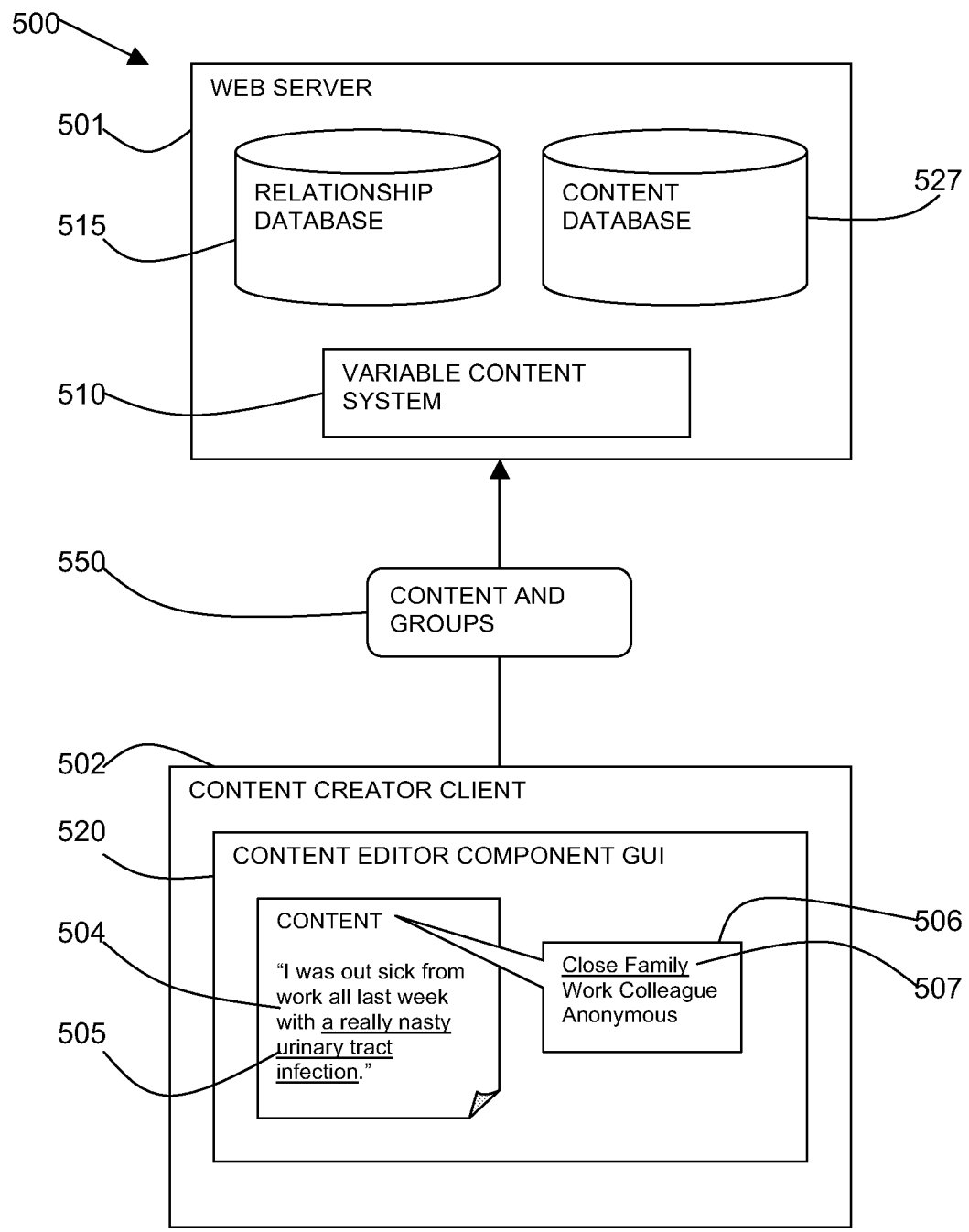
FIG. 5 is a schematic diagram of content creation in accordance with an aspect of the present invention.

Referring to FIG. 5, a schematic diagram 500 shows an example of the process of content creation using a content creator client 502.

A graphical user interface of a web-based content editor component 520 may be provided at a content creator client 502 in which the proposed content 504 may be entered. A section 505 of the proposed content may be selected, for example, by highlighting the section 505 (shown as underlining in the figure). A menu 506 of possible groups may be provided, for example, by a right click on the mouse or by hovering over the selected section 505. A group 507 for which the wording of the section 505 is applicable is chosen. The content creator client user may then enter an alternative wording of the section and save it for another chosen group.

The content including the variable content sections with their allocated groups 550 may be sent to the web server 501 to a variable content system 510 which saves the variable content and associated groups to a content database 527.

Figure 6A:
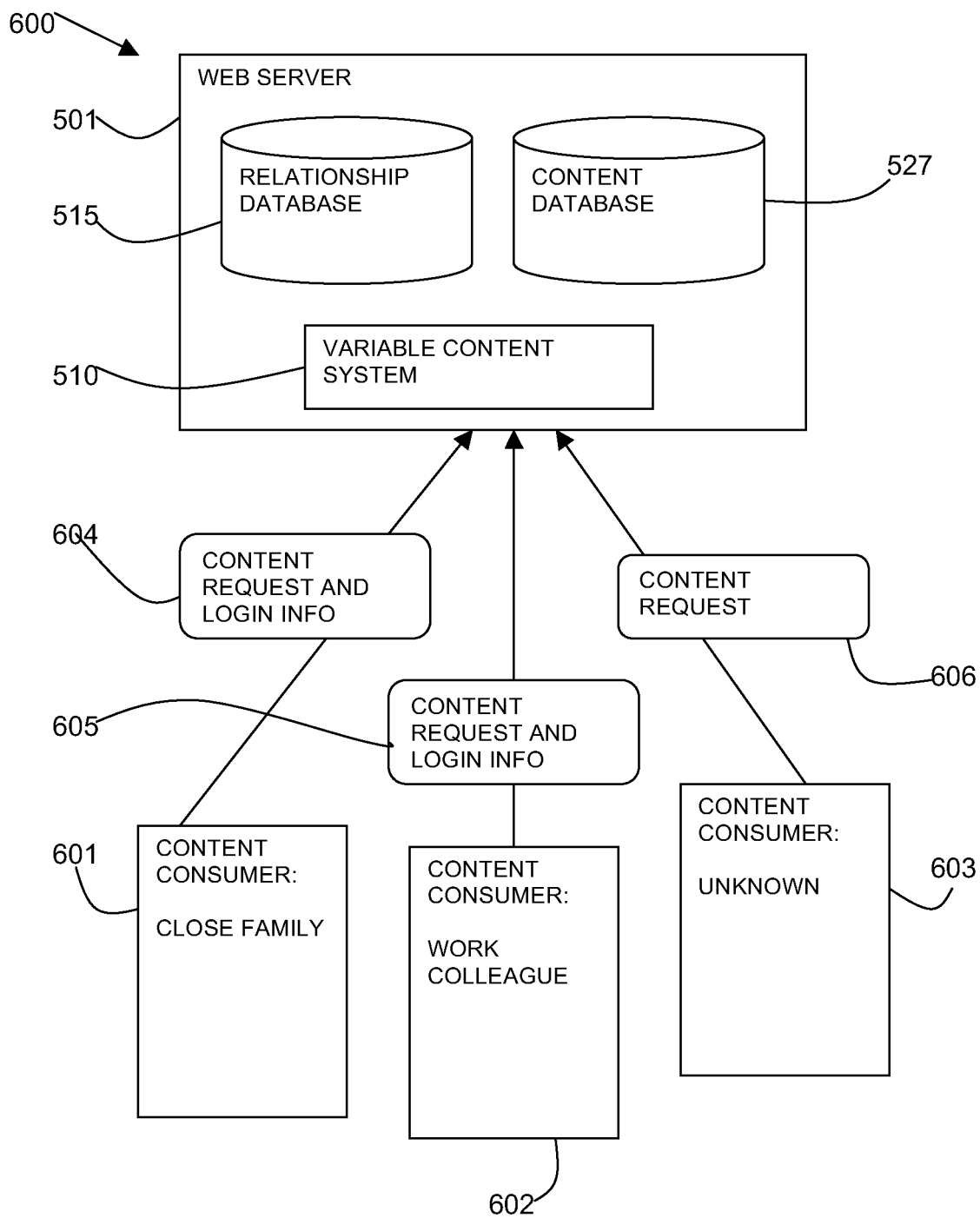
FIG. 6A is a schematic diagram of a content viewing request in accordance with an aspect of the present invention.
Figure 6B:
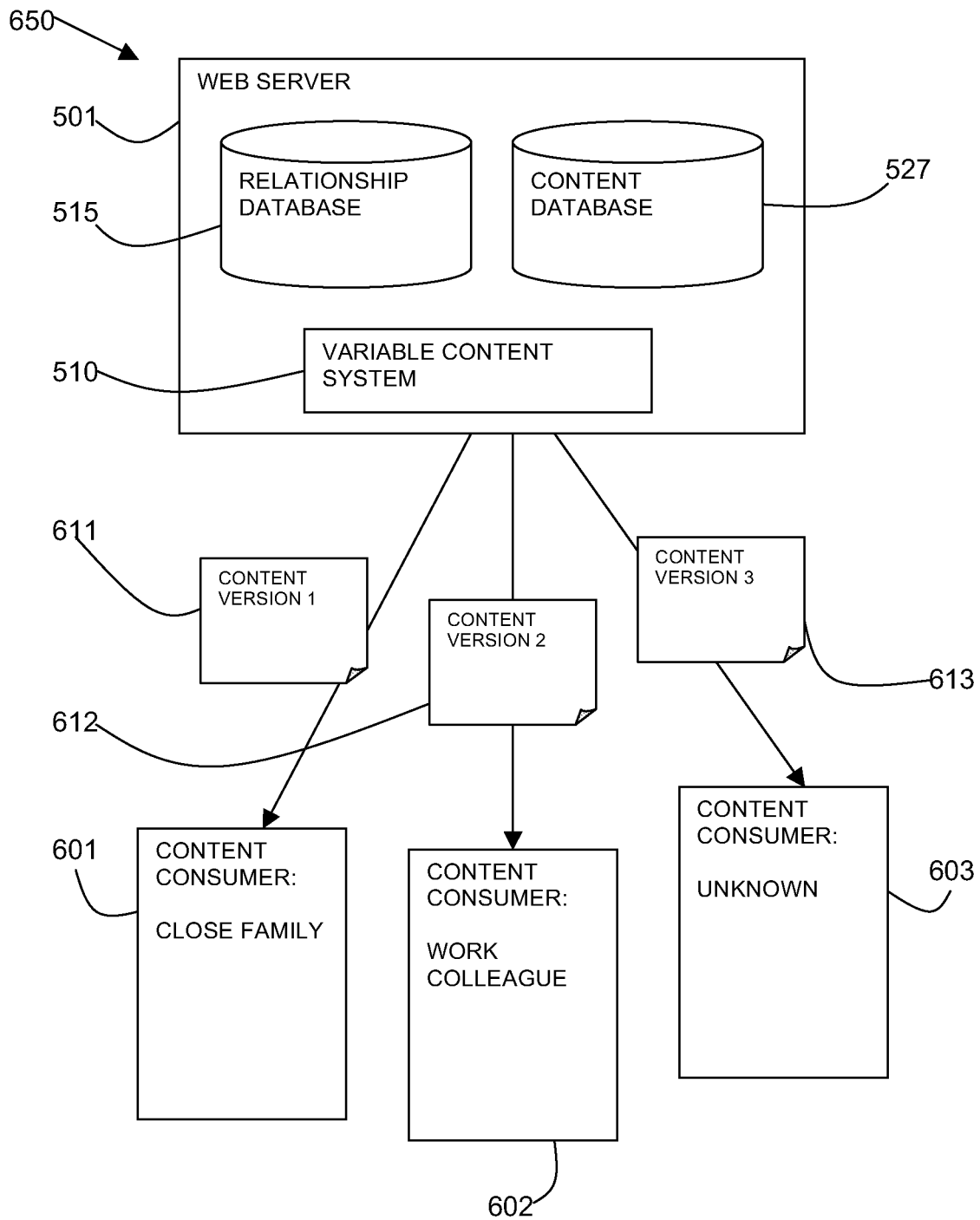
FIG. 6B is a schematic diagram of content viewing results in accordance with an aspect of the present invention.

Referring to FIGS. 6A and 6B, schematic diagrams 600, 650 show examples of the process of content viewing by a content consumer 601-603. The content consumer 601-603 may be one of different types. For example, the content consumer 601 may be a close family member 601, the content consumer 602 may be a work colleague 602, or the content creator 603 may be unknown.

In FIG. 6A, a content consumer 601-603 may request content 604-606 from a variable content system 510 at a web server 501. In some cases the content consumer 601-602 may provide login information 604-605.

The variable content system 510 may process the content request 604-606 and the login information, if available. The relevant group for a content consumer 601-603 may be determined by looking up the login information in a relationship database 515. If there is no login information as in the case of the unknown content consumer 603, the anonymous group may be used with a default content version. The variable content for the content request 604-606 for the relevant group may be retrieved from the content database 527.

In FIG. 6B, the content versions 611-613 of variable content retrieved for each of the content consumers 601-603 relevant groups may be forwarded by the variable content system 510 of the web server 501 to the content consumers 601-603.

For example, in the case of some textual content, three different versions are shown of an email message. The level of detail and potentially sensitive or confidential information may be varied between different groups.

The group of close family with a close relationship to the content creator may include more information. The group of work colleagues may provide a bit less information. The anonymous group which includes users with a most distant relationship to the content creator may include the least amount of information.

Example Variable Content

Close family: "I was out sick from work all week last week with a really nasty urinary tract infection. I went to see Dr. Brown, who sent me for tests. In the end he gave me Drug 1 which helped. It will take me more than a week to read all the emails I missed while I was out."

Work colleagues & customers: "I was out sick from work all week last week with an infection. I went to see the doctor, who sent me for tests. In the end he gave me medicine which helped. It will take me more than a week to read all the emails I missed while I was out."

Anonymous reader: "I was out sick from work all week last week. It will take me more than a week to read all the emails I missed while I was out."

Different variations of the same content are shared with people based on their relationship to content contributor. People are categorized into groups such as close friends, work colleagues, customers, extended family etc.

A special editor may be used to write or provide the post, comment, e-mail (or whatever it might be). The editor can provide alternative variations of the same content. The same process can be implemented in video and audio editors, or a combination of different media.

Different variations of the same content will be displayed to different people based on their relationship to content contributor/author as defined by the groups.

A system for variable content based on a relationship to the content creator may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Creator).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for providing variable content to content users, the method comprising:
    identifying content users based on one or more relationships defined between the content users and a content creator, wherein a content item created by the content creator is created in multiple versions, wherein the content item comprises individually separable content pieces so that the content creator selectively includes one or more of the individually separable content pieces in a version of the content as appropriate for a content user to use,
    wherein a first version of the content item is associated with a first content user based on a first relationship defined between the first content user and the content creator, wherein nature of said first relationship between the content creator and the first content user is known to the content creator, and the content creator includes in the first version of the content one or more of said individually separable content pieces, taking into account the nature of said first relationship, and
    wherein a second version of the content item is associated with a second content user based on a second relationship defined between the second content user and the content creator, wherein nature of said second relationship between the content creator and the second content user is known to the content creator, and the content creator includes in the second version of the content one or more of said individually separable content pieces, taking into account the nature of said second relationship,
    wherein excluded from the second version of the content are one or more separable content pieces that are included in the first version but are inappropriate for the second content user to use, and included in the second version of the content are one or more separable content pieces that are excluded from the first version, but are appropriate for the second content user to use;
    receiving a request for the content item from a content user;
    providing the first version of the content item to the first content user, in response to determining that the first content user has a first relationship with the content creator; and
    providing the second version of the content item to the second content user, in response to determining that the second content user has a second relationship with the content creator.

2. The method as claimed in claim 1, further comprising:
    defining groups of one or more content users having a similar relationship to a content creator;
    wherein determining the relationship of the content user to the content creator, determines which group a content user is defined in.

3. The method as claimed in claim 1, further comprising:
    defining a group of content users with no known relationship to a content creator.

4. The method as claimed in claim 1, further comprising:
    receiving login information from a content creator and using the login information to determine the group to which a content user belongs.

5. The method as claimed in claim 1, wherein the content item includes at least one or more of text, images, audio, or video.

6. The method as claimed in claim 1, further comprising:
    receiving a request from a content user to be defined in a specified group.

7. The method as claimed in claim 1, wherein a selected version of the content item is retrieved from a content database based on the determined relationship.

8. The method of claim 1, wherein the content user uses the content by at least one of: reading the content, viewing the content, listening to the content, accessing the content, writing the content, or updating the content.

9. A computer-implemented system for providing variable content to content users, the system comprising:
    a logic unit for identifying content users based on one or more relationships defined between the content users and a content creator, wherein a content item created by the content creator is created in multiple versions, wherein the content item comprises individually separable content pieces so that the content creator selectively includes one or more of the individually separable content pieces in a version of the content as appropriate for a content user to use,
    wherein a first version of the content item is associated with a first content user based on a first relationship defined between the first content user and the content creator, wherein nature of said first relationship between the content creator and the first content user is known to the content creator, and the content creator includes in the first version of the content one or more of said individually separable content pieces, taking into account the nature of said first relationship, and
    wherein a second version of the content item is associated with a second content user based on a second relationship defined between the second content user and the content creator, wherein nature of said second relationship between the content creator and the second content user is known to the content creator, and the content creator includes in the second version of the content one or more of said individually separable content pieces, taking into account the nature of said second relationship, wherein excluded from the second version of the content are one or more separable content pieces that are included in the first version but are inappropriate for the second content user to use, and included in the second version of the content are one or more separable content pieces that are excluded from the first version, but are appropriate for the second content user to use, receiving a request for the content item from a content user;

providing the first version of the content item to the first content user, in response to determining that the first content user has a first relationship with the content creator; and providing the second version of the content item to the second content user, in response to determining that the second content user has a second relationship with the content creator.

10. The system of claim 9, further comprising:
a logic unit for defining groups of one or more content users having a similar relationship to a content creator; wherein determining the relationship of the content user to the content creator, determines to which group a content user belongs.

11. The system of claim 9, further comprising:
defining a group of content users with no known relationship to a content creator.

12. The system of claim 9, further comprising:
receiving login information from a content creator and using the login information to determine the group to which a content user belongs.

13. The system of claim 9, wherein a content item includes at least one or more of text, images, audio, or video.

14. The system of claim 9, further comprising:
receiving a request from a content user to be defined in a specified group.

15. The system of claim 9, wherein a selected version of the content item is retrieved from a content database based on the determined relationship.

16. A computer program product comprising logic code embedded in a non-transitory data storage medium, wherein execution of the logic code causes a computer to:

identify content users based on one or more relationships defined between the content users and a content creator, wherein a content item created by the content creator is created in multiple versions, wherein the content item comprises individually separable content pieces so that the content creator selectively includes one or more of the individually separable content pieces in a version of the content as appropriate for a content user to use, wherein a first version of the content item is associated with a first content user based on a first relationship defined between the first content user and the content creator, wherein nature of said first relationship between the content creator and the first content user is known to the content creator, and the content creator includes in the first version of the content one or more of said individually separable content pieces, taking into account the nature of said first relationship, and wherein a second version of the content item is associated with a second content user based on a second relationship defined between the second content user and the content creator, wherein nature of said second relationship between the content creator and the second content user is known to the content creator, and the content creator includes in the second version of the content one or more of said individually separable content pieces, taking into account the nature of said second relationship, wherein excluded from the second version of the content are one or more separable content pieces that are included in the first version but are inappropriate for the second content user to use, and included in the second version of the content are one or more separable content pieces that are excluded from the first version, but are appropriate for the second content user to use:

receiving a request for the content item from a content user;

providing the first version of the content item to the first content user, in response to determining that the first content user has a first relationship with the content creator; and providing the second version of the content item to the second content user, in response to determining that the second content user has a second relationship with the content creator.

17. The computer program product of claim 16, wherein execution of the logic code further causes the computer to:
define groups of one or more content users having a similar relationship to a content creator; wherein determining the relationship of the content user to the content creator, determines to which group a content user belongs.

18. The computer program product of claim 9, wherein execution of the logic code further causes the computer to:
define a group of content users with no known relationship to a content creator.

19. The computer program product of claim 9, wherein execution of the logic code further causes the computer to:
receive login information from a content creator and using the login information to determine the group to which a content user belongs.

20. The system of claim 9, wherein the content user uses the content by at least one of: reading the content, viewing the content, listening to the content, accessing the content, writing the content, or updating the content.

21. The method of claim 16, wherein the content user uses the content by at least one of: reading the content, viewing the content, listening to the content, accessing the content, writing the content, or updating the content.

* * * * *